United States Patent
Chevalier (10) Patent No.: US 8,698,550 B2
(45) Date of Patent: Apr. 15, 2014

(54) DUAL OUTPUT CHARGE PUMP GENERATING TWO VOLTAGE VALUES WITH TWO DISTINCTIVE LEVELS, AND METHOD FOR THE SAME

(75) Inventor: Laurent Chevalier, Sassenage (FR)

(73) Assignee: St-Ericsson SA, Plan-les-Ouates (CH)

( * ) Notice: Subject to any disclaimer, the term of this patent is extended or adjusted under 35 U.S.C. 154(b) by 0 days.

(21) Appl. No.: 13/816,349

(22) PCT Filed: Aug. 25, 2011

(86) PCT No.: PCT/EP2011/004258
§ 371 (c)(1),
(2), (4) Date: May 7, 2013

(87) PCT Pub. No.: WO2012/025232
PCT Pub. Date: Mar. 1, 2012

(65) Prior Publication Data
US 2013/0214852 A1    Aug. 22, 2013

Related U.S. Application Data (60) Provisional application No. 61/447,830, filed on Mar. 1, 2011.

(30) Foreign Application Priority Data

Aug. 26, 2010   (EP) ..................................... 10368033

(51) Int. Cl.
*G05F 1/10*    (2006.01)
(52) U.S. Cl.
USPC ........................................................ 327/536
(58) Field of Classification Search
USPC .................. 327/530, 534–537; 363/59, 60
See application file for complete search history.

(56) References Cited

U.S. PATENT DOCUMENTS

| 2007/0252640 A1 | 11/2007 | Lin et al. |
| 2008/0036542 A1 | 2/2008 | Chen et al. |
| 2008/0044041 A1 * | 2/2008 | Tucker et al. .................. 381/120 |
| 2010/0176872 A1 | 7/2010 | Saikusa et al. |

FOREIGN PATENT DOCUMENTS

EP           0 585 925 A2      3/1994

OTHER PUBLICATIONS

International Search Report issued in corresponding International application No. PCT/EP2011/004258, date of mailing May 3, 3012.
Written Opinion of the International Searching Authority issued in corresponding International application No. PCT/EP2011/004258,date of mailing May 3, 2012.

* cited by examiner

*Primary Examiner* — Lincoln Donovan
*Assistant Examiner* — Sibin Chen
(74) *Attorney, Agent, or Firm* — Patent Portfolio Builders PLLC (57) ABSTRACT

A dual voltage charge pump circuit to be associated with one power supply for the purpose of generating two positive and negative output voltages, with two different low and high levels. The circuit comprises two flying capacitors and two tank capacitors. PMOS transistors and NMOS transistor for achieving the charge transfer between the fly capacitor and the respective tank capacitor. Additional transistors are used for providing a low voltage charge pump as well as charge compensation between the two fly capacitors. Preferably, one fly capacitor has one end directly connected to the ground, what reduces the complexity of the dual charge pump and achieves saving of MOS transistor and ball.

15 Claims, 10 Drawing Sheets

DUAL OUTPUT CHARGE PUMP GENERATING TWO VOLTAGE VALUES WITH TWO DISTINCTIVE LEVELS, AND METHOD FOR THE SAME

TECHNICAL FIELD

The invention relates to the field of electronic circuits and more particularly to a Switched Mode Power Supply circuit comprising a dual output charge pump providing two different output levels of positive and negative voltage.

BACKGROUND ART

The development of portable electronic equipments in general, and mobile phones in particular, has revealed a significant interest for the use of Switched Mode Power Supply (SMSP).

Indeed, such SMPS system, in contrary to linear regulators, achieves a high efficiency—of the order of 90 or 95%—which is well beyond what is allowed by linear voltage regulator and therefore, electronic products manufacturer tend to generalize their use in a wide variety of portable devices, including mobile phones, MP3 players, Portable Device Assistant etc. . . .

Considering, for instance, the particular case of mobile phones, those device tend to incorporate many multimedia functions, including specific audio capabilities. A mobile phone is now likely to serve as a MP3 player and thus incorporates an audio amplifier which, for the purpose of saving the battery life, is preferably based on class AB or even class G using an voltage supply which is adjusted in accordance to the level of the audio signal to amplify.

The presence of such a class G audio amplifier, in addition to the more conventional communications circuits (RF transceivers, DSP etc. . . . ) have lead to the incorporation, within a same product, of two separate SMPS systems, a first one having a fixed output voltage for the purpose of supplying the main parts of the equipment and a second one, more specific to the audio amplification, providing different levels of output voltage for the power supply of the audio circuits.

Clearly, the use of two different SMPS systems causes a significant increases in the manufacturing costs of the product, at least because—as known by a skilled man—a SMPS device is based on the use of a external L-C network and that a L coil occupies a non negligible area.

As a conclusion, there is a desire for a new SMPS system improving efficiency and versatility for allowing integration, within a single integrated circuit, of various features and electronic circuits, such as a general purpose circuitry requiring a fixed voltage power supply and a specific audio circuit requiring at least two power supplies.

In addition, it is highly desirable that such SMPS system be simple and low cost to manufacture.

SUMMARY OF THE INVENTION

It is an object of the present invention to provide a SMSP voltage supply circuit which advantageously combine great efficiency and versatility for allowing the supply of a specific Class G audio amplifier.

It is another object of the present invention to provide a SMPS voltage supply system which includes a dual voltage charge pump allowing different levels of the output voltage.

It is a further object of the present invention to provide a power supply circuit based on a limited number of components, and one coil for embodying both the generic SMPS and the specific audio voltage supply subsystem.

It is still a further object of the present invention to provide a sophisticated power supply circuit which reduces the number of balls required for an integrated circuit product.

It is still another object of the present invention to provide the combination of a SMPS with a dual charge pump which keeps the gain of efficiency in low voltage mode while minimizing the area and reducing the number of balls, of Power MOS and PADS.

These and other objects of the invention are achieved by means of a dual voltage charge pump circuit to be associated with one pre-existing SMPS circuit, for the purpose of generating to positive and negative output voltages (Vpos, Vneg), with two different low and high levels. The dual voltage charge pump comprises two flying capacitors and two tank capacitors, and additional transistors for achieving the charge transfer between the fly capacitor and its respective tank capacitor.

Additional transistors are provided so as to achieve charge compensation between the fly capacitors.

Preferrably, one fly capacitor has one end connected to the ground, so as to achieve reduction in the number of MOS transistor as well as ball saving.

The invention particularly achieves one charge pump circuit comprising:

a first flying capacitor having a first and a second end, said second end being connected to the ground;

a second flying capacitor having a first and a second end;

a first tank capacitor having a first and a second end, the latter being connected to the ground;

a second tank capacitor having a first and a second end, the latter being connected to ground;

a first transistor P0 (PMOS) having source, drain and gate terminal, the source of said first transistor being connected to the power supply (Vdd), the drain being connected to a first end of the first fly capacitor and the gate receiving a first control signal;

a second transistor N1 (NMOS) having a source and a drain respectively connected to the ground, to the second end of the first fly capacitor and a gate receiving a second control signal;

a third transistor P2 (PMOS) having source, drain and gate terminals, the source being connected to the power supply (Vdd), the drain being connected to the first end of the second fly capacity, and said gate receiving a third control signal (NPH1L);

a fourth transistor N2 (NMOS) having source, drain and gate terminals, the source being connected to the ground, the drain being connected to the first end of the second fly capacitor and the gate receiving a fourth control signal (NPH2L);

a fifth transistor N3 (NMOS) having source, drain and gate terminals, the source being connected to the ground, the drain being connected to the second end of the second flying capacitor, and the gate receiving a fifth control signal (NPH1H);

a sixth transistor P3 (PMOS) having source, drain and gate terminals, the source r being connected to the first end of the first flying capacitor and the drain being connected to the first second end of the second fly capacitor, and the gate receiving a sixth control signal (PPS1L);

a seventh transistor N5 (NMOS) having source and drain respectively connected to the first end of the first fly capacitor and to the first end of the second fly capacitor (33), a,d a gate a seventh control signal (PPS2L);

an eight transistor P1 (PMOS) having source, drain and gate terminal, the source being connected to the first end of the first fly capacitor and the drain being connected to the first end of the first tank capacitor and generating the positive output voltage (Vpos), the gate of the eight PMOS transistor receiving a eight control signal (PPH2L);

a ninth transistor N4 (NMOS) having source, drain and gate terminals, the drain being connected to the second end of the second fly capacitor, the source being connected to said first end of said second tank capacitor and generating the desired negative voltage (Vneg), the gate receiving a ninth control signal (NPH2H).

In one embodiment the sixth and seventh MOS transistors are PMOS and NMOS transistors respectively. Alternatively, in accordance with the particular values of Vdd and the positive and negative output values, those two transistors may be of a reverse polarity.

The invention also achieves a method for operating the dual voltage charge pump by generating either high or low positive/negative output voltages.

In the positive part of the charge pump, a high positive voltage is performed by means of the following steps:

switching on the first transistor P0 during a first phase while switching off all other transistors so as to charge said first fly capacitor at the nominal voltage value (Vdd) available;

switching on the eight transistor P1 so as to perform a charge transfer from said first fly capacitor to said first tank capacitor.

In the negative part of the charge pump, a high value is generated by the following steps:

switching on the third transistor P2 and the firth transistor N3 during a first phase while switching off all other transistors so as to charge said second fly capacitor at the nominal voltage value (Vdd) available;

switching on the fourth transistor (N2) and the ninth NMOS transistor (N4) so as to perform a charge transfer from the second fly capacitor to said second tank capacitor.

Preferably, a third phase of load compensation is involved by means of the switching on the sixth transistor.

The invention at last achieves a method which performs generation of a low values for Vpos and Vneg, by the following steps:

switching on the third PMOS transistor P2 and the sixth transistor P3 during a first phase while switching off all other transistors so as to charge said first and second fly capacitors at half the nominal value (Vdd) available; and, generating the low positive voltage by switching on the eight transistor P1 and generating the low negative voltage by switching on the fourth transistor N2 and the ninth transistor N4, all other transistors being switched off, so as to perform a partial transfer of charge from said first and said second fly capacitor to said first and second tank capacitors, respectively.

In one embodiment, the drain of said first transistor (P0, P'0) is directly connected to the load instead of being connected to the first end of the first fly capacitor (72) so as to reduce the voltage drop during the high voltage generation.

The invention is particularly useful for realizing portable electronic devices, including audio features, such as a G class audio amplifier.

DESCRIPTION OF THE DRAWINGS

Other features of one or more embodiments of the invention will best be understood by reference to the following detailed description when read in conjunction with the accompanying drawings.

DESCRIPTION OF THE PREFERRED EMBODIMENT

There will now be described particular embodiments of a SMPS system which allows great efficiency and which may also serve for supply power to a class G audio amplifier, with a limited number of external devices, chip balls, PADS, Areas.

For the sake of illustration, one will particularly consider the example of a G CLASS Audio amplifier, which power supply is modulated according to the audio signal, wherein a pre-existing SMPS already provides a fix supply voltage of, for instance, 1.8 Volts.

Figure 1:
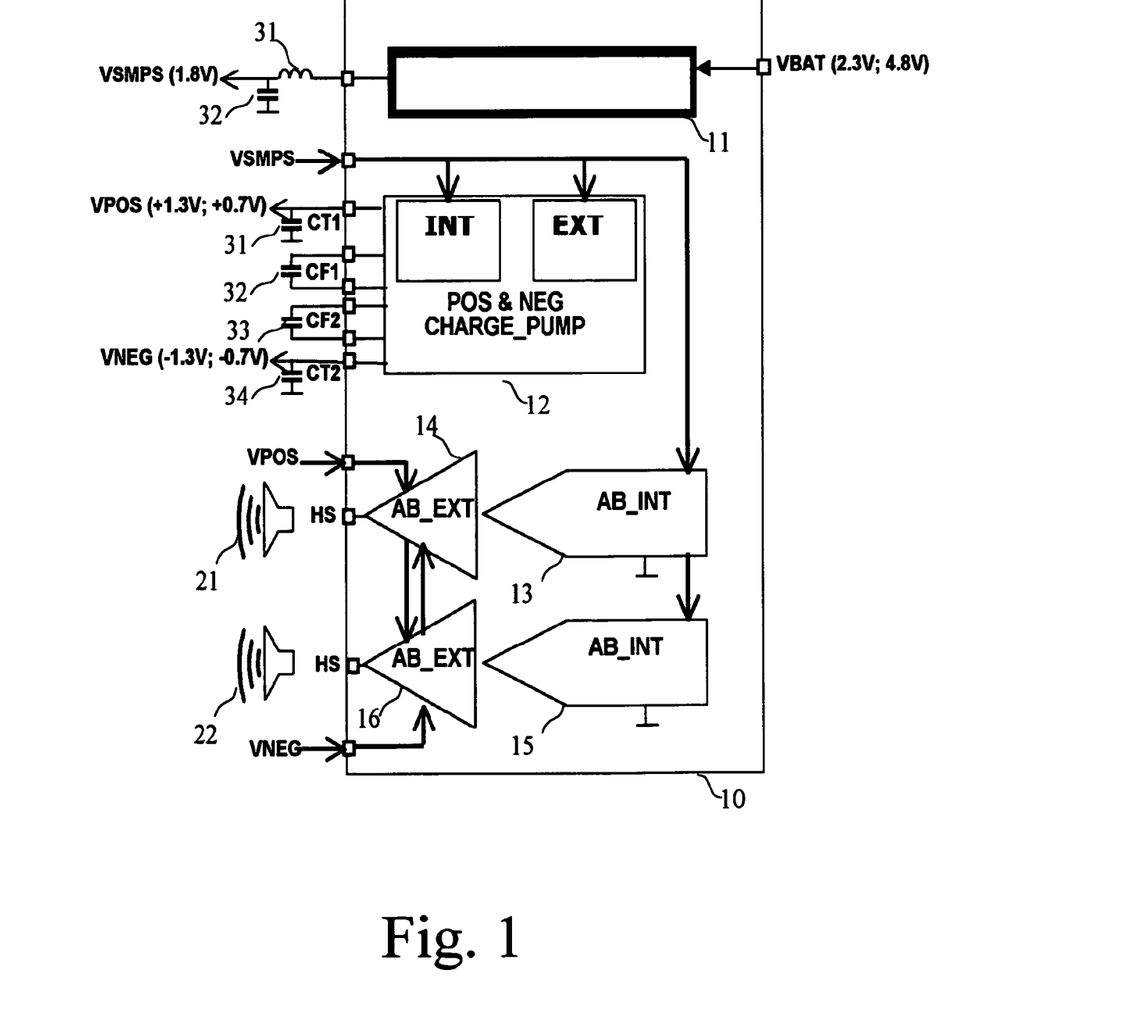
FIG. 1 illustrates the general architecture of one embodiment of the invention, combining a SMPS circuit with a dual voltage charge pump for the purpose of supplying both a fixed and a two-levels voltages.

FIG. 1 illustrates such embodiment of a device 10 which is powered by a power supply voltage VBAT (between 2.3V and 4.8V in accordance with the status of the battery (not shown). Device 10 includes a conventional SMPS circuit 11 which is associated with external components, i.e. one coil 31 and a capacitor 32, for the purpose of generating a fixed output voltage, e.g. 1.8 Volts.

Clearly, the SMPS circuit 11 may be embodied by means of any known SMPS circuit well known to a skilled man and such circuit will not be further elaborated on.

Since the device 10 is arranged to offer specific audio capabilities and connections to two loudspeakers 21 and 22. For that purpose, device 10 comprises specific audio circuits, e.g. a AB class audio amplifier embodied by internal block 13 (AB_INT) and external block 14 (AB_EXT), the audio amplifier being arranged to drive a first loudspeaker 21. Similarly, device 10 comprises specific audio circuits, e.g. a AB class audio amplifier embodied by internal block 15 (AB_INT) and external block 16 (AB_EXT), the audio amplifier being arranged to drive a second loudspeaker 22.

The embodiment includes, in addition to the pre-existing SMPS, a dual voltage charge pump 12 being powered by SMPS system 11 and which two positive and negative output voltages having possibly two different voltages.

In the example being considered, and illustrated in FIG. 1, the dual output CHARGE_PUMP provides both modulated supply (POSITIVE and NEGATIVE) on the range ±1.35V; ±0.7V, which are used for supplying voltage to the audio amplifier.

As known by a skilled man a charge pump is conventionally based on one capacitor—known as a "fly or flying capacitor"—which serves for the transfer of charge to one or more "tank" or "reservoir" capacitor.

In the practical embodiment of FIG. 1, dual voltage charge pump 12 is associated to four external capacitors, respectively two flying or fly capacitors 32 and 33 and two reservoir or tank capacitors 31 and 34.

In order to maximize the amplitude of the audio signal the charge pump provides high output voltage (±1.3V) on the audio amplifier with the structure below. However, in order to minimize power consumption for small audio signals, a second set of low output voltages (±0.7V) is generated by dual charge pump 12 which will now be more precisely described in reference with FIG. 2.

Figure 2:
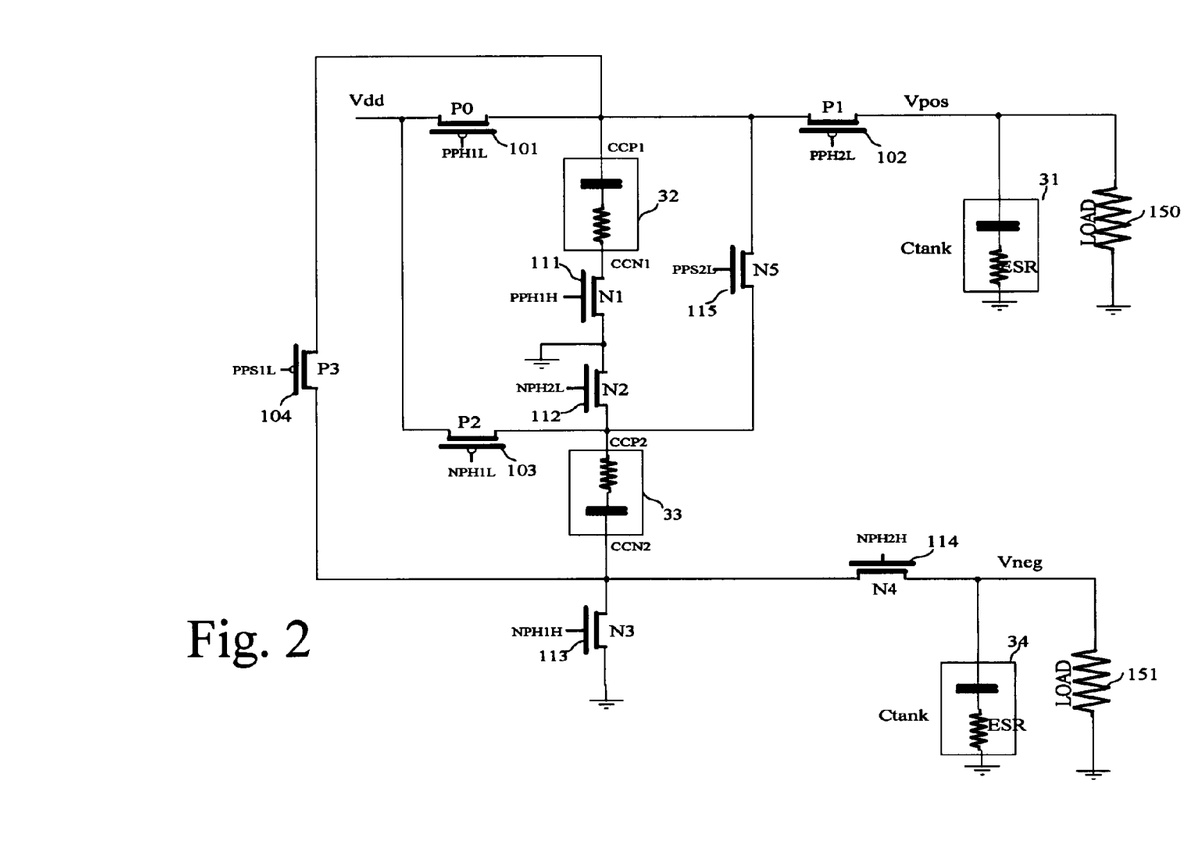
FIG. 2 illustrates one particular embodiment of a dual voltage charge pump circuit which can be used with one fixed voltage SMPS circuit.

Charge pump 12 comprises a first PMOS transistor 101 (P0) having source and drain terminals as well as a gate terminal receiving a control signal PPH1L. The source of PMOS transistor 101 is connected to Vdd while its drain is connected to a first end of a first fly capacitor 32 (represented in FIG. 1 with its internal resistor). Fly capacitor fly 32 has a second end which is connected to the drain terminal of a NMOS transistor 111 (N1) having its source terminal connected to the ground and a gate terminal receiving a control signal PPH1H.

Charge pump 12 further comprises a second PMOS transistor 103 (P2) having source and drain terminals, and a gate terminal which receives a control signal NPH1L. The source of PMOS transistor 103 is connected to Vdd while its drain is connected to a first end of a second fly capacity 33 (represented in FIG. 1 with its internal resistor) and also to the drain of a NMOS transistor 112 (N2) which source is connected to ground. Transistor 112 has a gate terminal which receives a control signal NPH2L. Fly capacitor 33 has a second end which is connected to the drain terminal of a NMOS transistor 113 (N3) having its source terminal connected to the ground and a gate terminal receiving a control signal NPH1H.

The first end of fly capacitor 32 and the second end of fly capacitor 33 are connected via the terminals drain and source of a MOS transistor 104 (P3) having a gate terminal receiving a control signal PPS1L. Also, the first end of fly capacitor fly 32 and the first end of fly capacitor 33 are connected via the two drain-source terminals of a MOS transistor 115 (N5) receiving control signal PPS2L at its gate terminal. In the particular embodiment which is represented in FIG. 2, corresponding to the voltage levels indicated in FIG. 1, MOS transistor 104 (P3) and MOS transistor 116 (N5) are a PMOS transistor and a NMOS transistor, respectively. However, it is clear to the skilled man that, should other practical voltage values be desired, the two transistors 104 and 115 might be of a reverse polarity.

At last, the first end of fly capacitor 32 is connected to the source terminal of a PMOS transistor 102 (P1), the drain of which is connected to a first end of tank capacitor 310 (which was already illustrated in FIG. 1 and which is now illustrated with its internal resistor ESR) and also to a first terminal of a positive load 150 (represented by a resistor). Transistor 102 has a gate terminal which receives a control signal PPH2L. The drain terminal of transistor 102 thus generates the positive voltage Vpos. Capacitor 140 and load 150 have their second ends being connected to the ground.

Similarly, the second end of fly capacitor 33 is connected to the drain terminal of a NMOS transistor 114 (N4), the source of which generating the negative voltage Vneg and being connected to a first end of tank capacitor 34 (incl. its internal resistance ESR) and also to a first terminal of the negative load 151. Capacitor 34 and load 151 have their second ends being connected to the ground.

The skilled man will take notice that the two positive and negative voltages Vpos and Vneg may be used for driving a AB class amplifier, or even a G class amplifier as will become apparent hereinafter, with the subsequent drawings of FIGS. 3 and 4, which illustrates the generation of either high level of low level positive and negative voltages Vpos and Vneg.

Charge pump 12 is arranged to provide, from the single fixed positive voltage Vdd supplied by the SMPS system, a set of two distinct voltages, positive Vpos and negative Vneg, respectively at 0.7V and 1.3V, for the purpose of supplying current to a G class amplifier.

Figure 3:
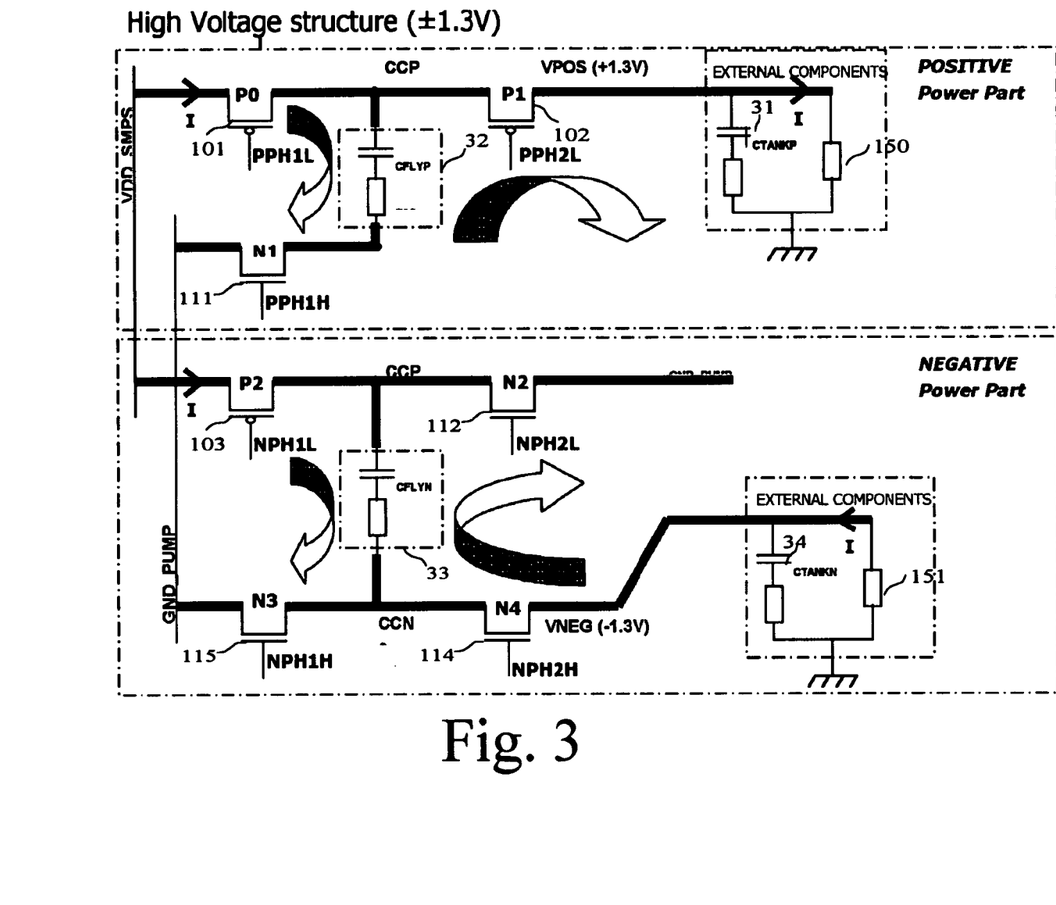
FIGS. 3 and 4 illustrate the operating of the embodiment of FIG. 2 for generating either high level of low level positive and negative voltages Vpos and Vneg.

FIG. 3 shows the generation of the high voltage structure for the purpose of generating the two high level voltages Vpos=+1.3 V and Vneg=−1.3V, which are only given by way of example.

To achieve this the dual charge pump operates as follows:

Regarding the positive part of the dual voltage charge pump, one can see that, during a first phase, fly capacitor 32 is being charged by means of the switching ON of transistors PMOS transistor P0 and NMOS transistor N1, leading Vdd voltage to be applied between the first and second ends of the latter capacity fly 32. Then, in a second phase, transistor P0 is being switched OFF while transistor P1 is switching ON, thus resulting in a transfer of charge to the tank capacitor 31 and the load 150.

One sees that, taking into account the voltage drop between the drain-source terminals of the MOS transistors, the tank capacitor may be charged with a voltage of about 1.3 Volts.

Regarding the negative part of the dual charge pump, the latter works as follows: in a first phase, transistors P2 and N3 switched ON, what results in the application of the Vdd voltage between the first and second ends of fly capacitor 33 and, in a subsequent second phase, transistors P2 and N3 are switched OFF while transistors N3 and N4 are switched ON so as to draw current to the ground and thus generate Vneg=−1.3 Volts.

Clearly, such process is controlled by means of the application of appropriate control signals to the gate of transistors P0-P1-P2 and N1-N4 and the generation of such control signals is well known to a skilled man and will not be further elaborated on.

Figure 4:
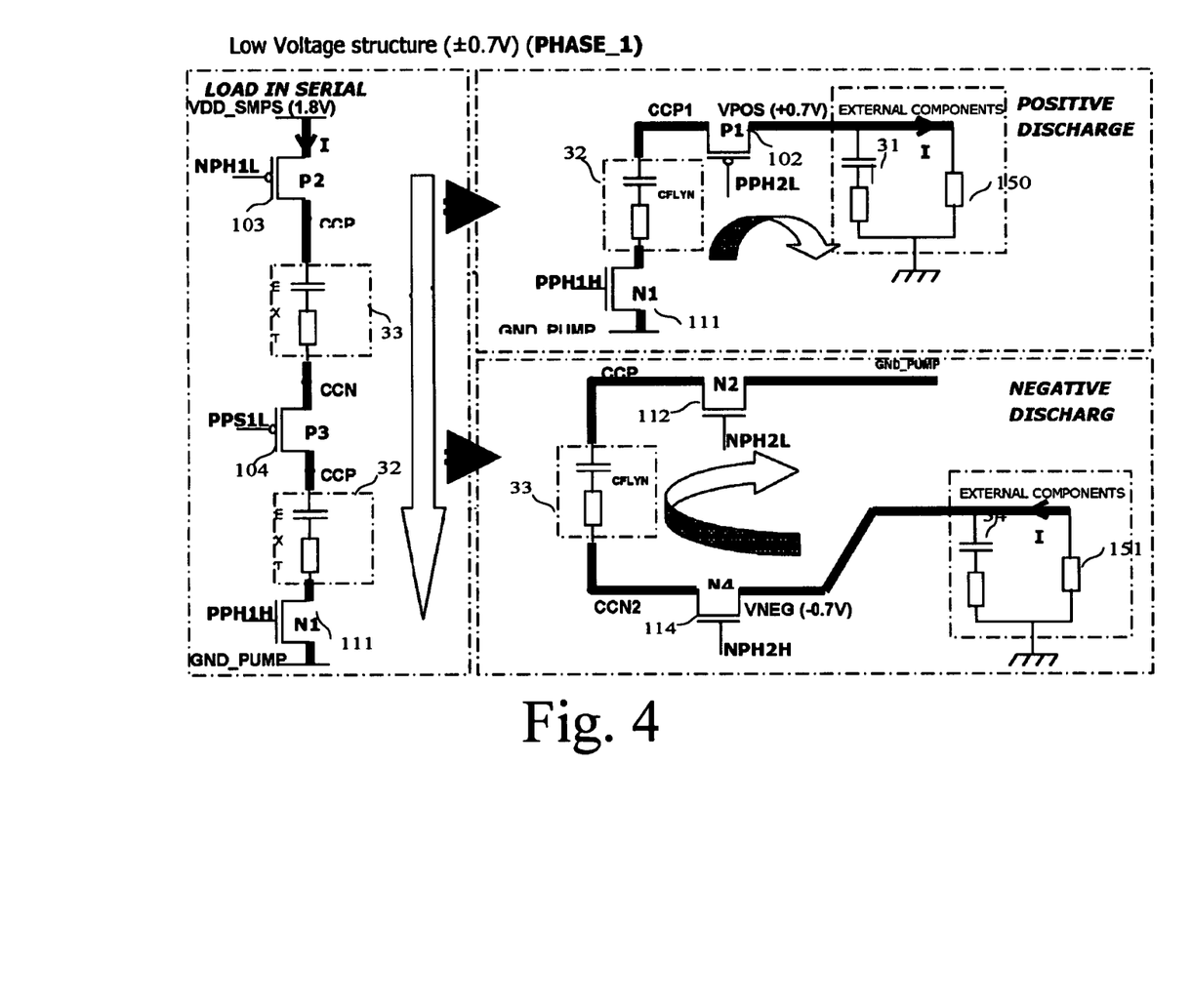

Now considering FIG. 4, one sees that the same circuit may be used for embodying a dual low-voltage charge pump.

In a first phase, transistors N1, P2 and P3 are switched ON while all other transistors are switched OFF, so as to establish a connection in series of the two fly capacitors 32 and 33 between the ground and Vdd.

Such series connection results in the fact that each fly capacitor is being charged to half the nominal value of 1.7V, that is to say approximately at 0.7V.

Then, in a subsequent second phase, all transistors are switched OFF except:
- for the positive part, transistors N1 and P1 which are switched ON so as to perform a charge transfer (of half the nominal value) to the Tank capacitor 31; and
- for the negative part, transistors N2 and N4 are switched ON so as to achieve a similar charge transfer to the tank capacitor 34 and the load 151.

This shows that, at the end of the second step, the tank capacitors can be charged so as to produce a low voltage of about 0.7V and −0.7V.

Consequently, the circuit which was described in FIG. 2 shows great flexibility since it allows to produce a low or a high dual voltage, as required.

In particular, the generation of the different control signals applied to the gates of the transistors can be performed so as to control the generation of the low or high voltage in accordance with the actual level of an analog signal, thus achieving the voltage supply of a G class audio amplifier.

In one particular embodiment, the second step which was described above is—optionally—followed by a third step where transistors N1, N2 and N5 are switched ON so as to perform a load compensation before the next subsequent charging of the fly capacitors 32 and 33.

Figure 5:
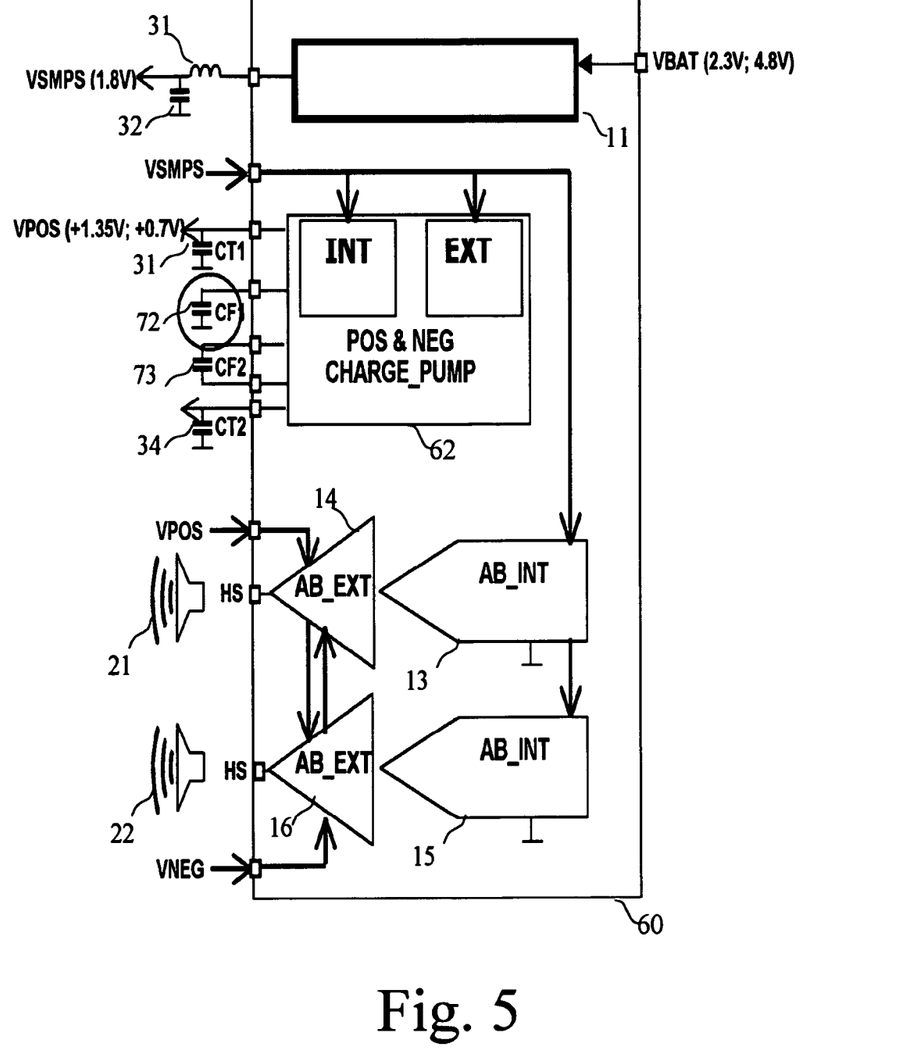
FIG. 5 illustrates the general architecture of a second embodiment which reduces the number of transistors and also the number of balls required in the integrated circuit.

With respect to FIG. 5, there is now illustrated a second embodiment 60 which advantageously reduces the number of MOS transistors and also the number of balls required in the integrated circuit product.

All the elements being common with the embodiment of FIG. 2 have kept their reference numbers, such as the SMPS circuit 11, the audio amplifiers blocks 13 and 14 (resp. 15 and 16), as well as capacitors tanks 31 and 34.

However, one sees that device 60 now includes a new dual voltage charge pump 62 associated with fly capacitors 72-73, one of which having one end directly connected to the ground.

With the consequence of the saving of one ball and one power MOS transistor. In addition, the resistivity access to the ground of fly capacitor 32 is optimized because the current do no longer need to pass through a power MOS transistor during the load and the discharge of that fly capacitor.

Furthermore, it has been discovered by the inventor that, for the low voltage structure, the fact that the fly capacitor 72 is directly connected to the ground does not prevent the circuit from operating properly and achieving two high and low level output voltages. Actually, both fly capacitors are loaded at the same time and then the positive fly capacitor 72 and the negative fly capacitor 73 are discharged in the positive negative output, respectively.

Figure 6:
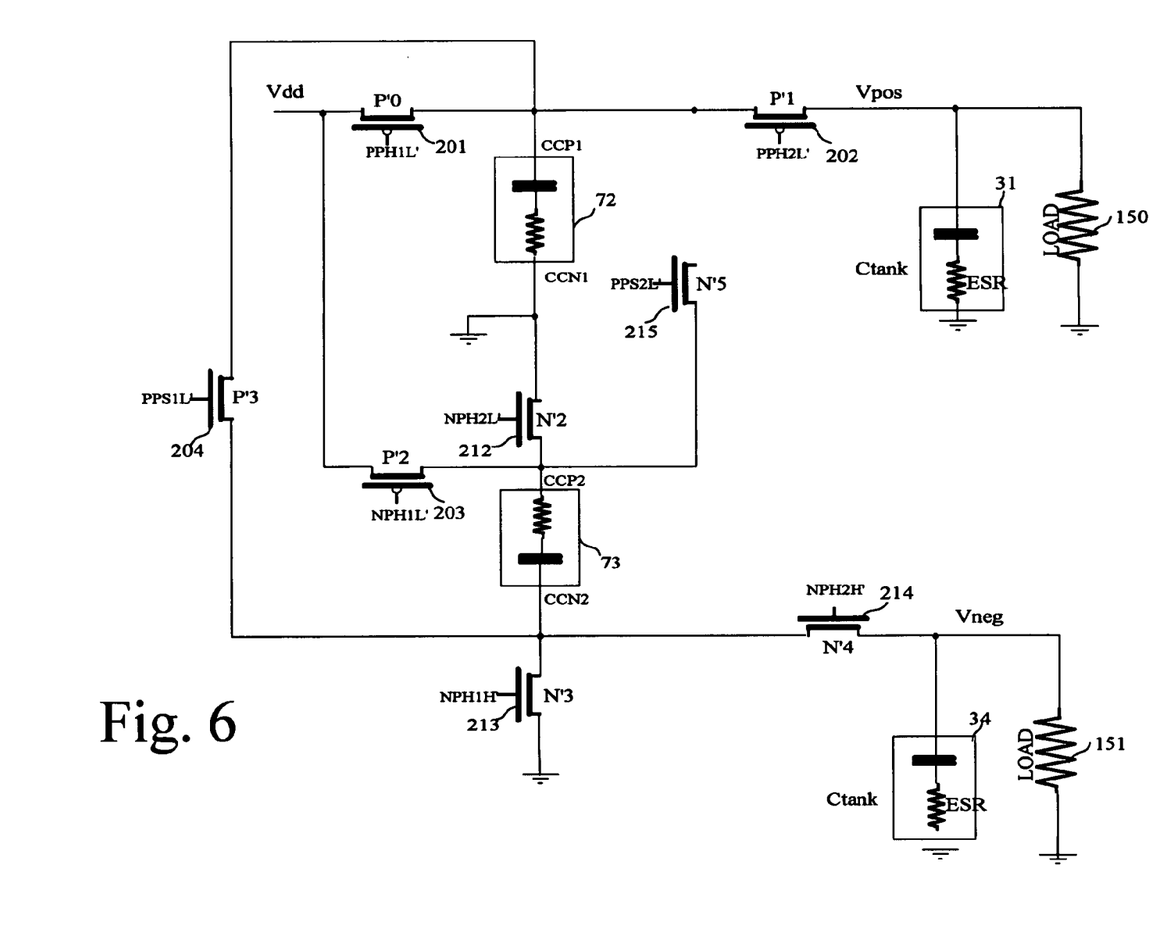
FIG. 6 illustrates the detail of the second embodiment.

The detail of this particular and advantageous dual voltage charge pulp is shown in FIG. 6 which will now be described in greater details.

Charge pump 62 comprises a first PMOS transistor 201 (P'0) having source and drain terminals as well as a gate terminal which receives a control signal PPH1L'. The source of PMOS transistor 201 is connected to Vdd while its drain is connected to a first end of a first fly capacitor 72, the second end of which being connected to the ground.

Charge pump 12 further comprises a second PMOS transistor 203 (P'2) having source and drain terminals, and a gate terminal which receives a control signal NPH1L'. The source of PMOS transistor 203 is connected to Vdd while its drain is connected to a first end of a second fly capacity 73 and also to the drain of a NMOS transistor 212 (N'2) having its source terminal connected to ground. Transistor 212 has a gate terminal which receives a control signal NPH2L'. Fly capacitor 73 has a second end which is connected to the drain terminal of a NMOS transistor 213 (N'3) having its source terminal connected to the ground and a gate terminal receiving a control signal NPH1H.

The first end of fly capacitor 72 and the second end of fly capacitor 73 are connected via the terminals drain and source of a MOS transistor 204 (P'3) having a gate terminal receiving a control signal PPS1L'. Also, the first end of fly capacitor fly 72 and the first end of fly capacitor 73 are connected via the two drain-source terminals of a MOS transistor 215 (N'5) receiving control signal PPS2L' at its gate terminal. In the particular embodiment which is represented in FIG. 6, corresponding to the voltage levels indicated in FIG. 5, MOS transistor 204 (P3) and MOS transistor 215 (N5) are a PMOS transistor and a NMOS transistor, respectively. However, it is clear to the skilled man that, should other practical voltage values be desired, the two transistors 204 and 215 might be of a reverse polarity.

At last, the first end of fly capacitor 72 is connected to the source terminal of a PMOS transistor 202 (P'1), the drain of which is connected to a first end of tank capacitor 31 and also to a first terminal of positive load 150. The drain terminal of transistor 202 thus generates the positive voltage Vpos. Capacitor 31 and load 150 have their second ends being connected to the ground.

Similarly, the second end of fly capacitor 73 is connected to the drain terminal of a NMOS transistor 214 (N'4), the source of which generating the negative voltage Vneg and being connected to a first end of tank capacitor 34 and also to a first terminal of the negative load 151. Capacitor 34 and load 151 have their second ends being connected to the ground.

Figure 7:
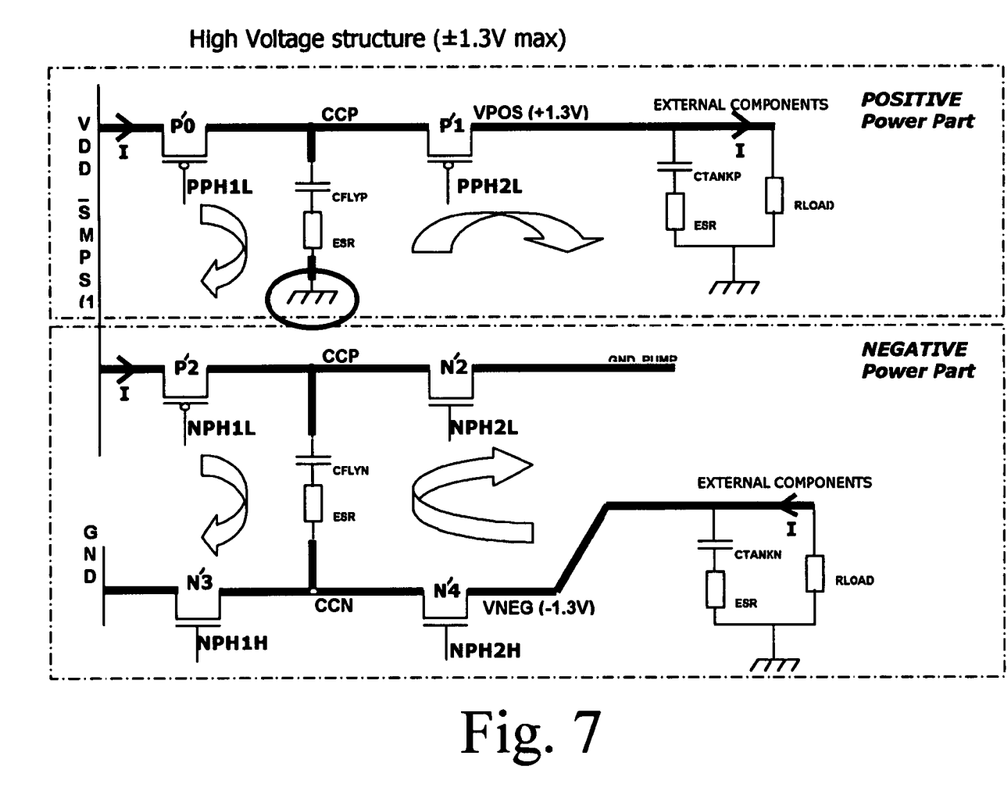
FIGS. 7 and 8 illustrate the operating of the second embodiment or generating either high level of low level positive and negative voltages Vpos and Vneg.
Figure 8:
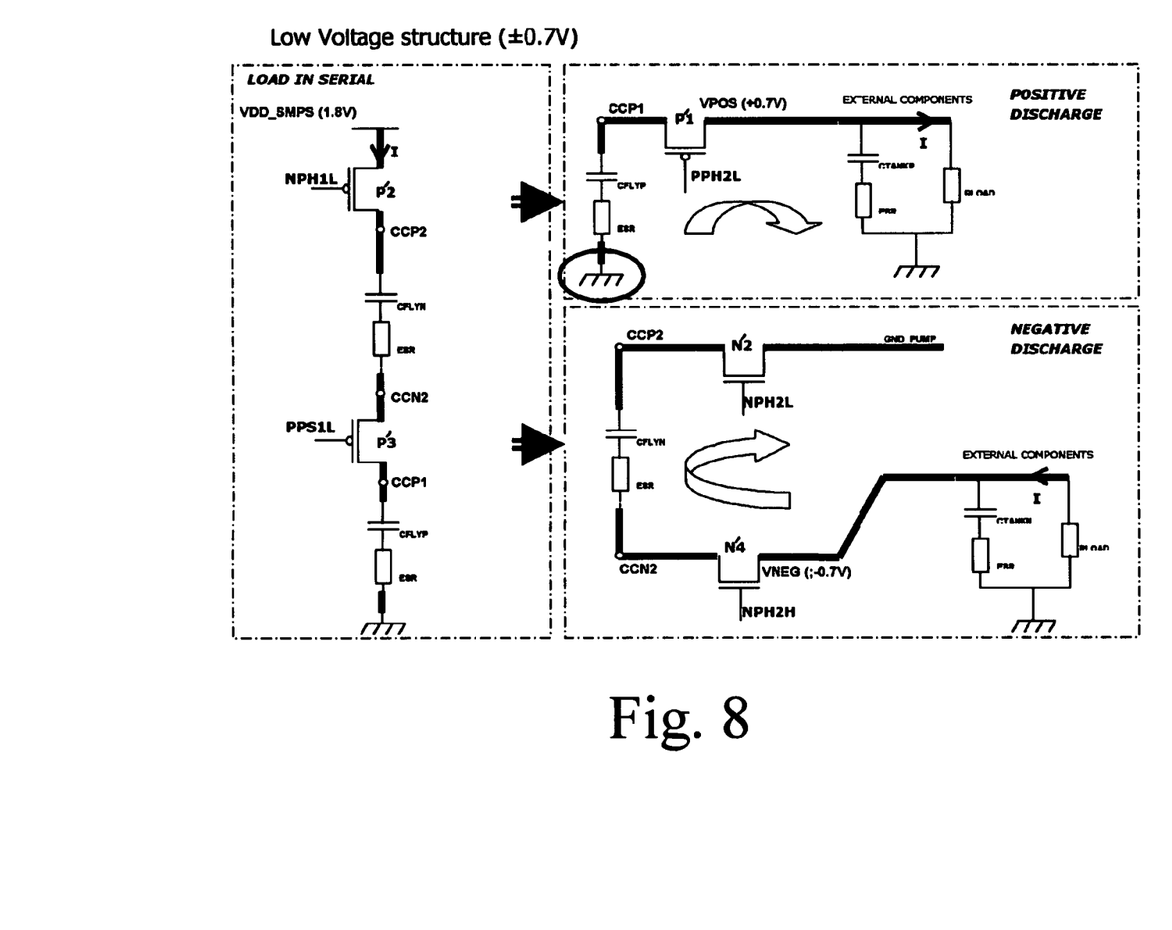

FIGS. 7 and 8 illustrate the operating of the second embodiment or generating either high level of low level positive and negative voltages Vpos and Vneg.

The high voltage generation (1.3V) is illustrated in FIG. 7 and operates as follows:
  during a first phase, transistors P'0, P'2 and N'3 are switched on while all the other transistors being switched OFF, thus causing the charging at Vdd of the two fly capacitors 72 and 73, respectively.
  during the second phase, all the transistors are switched OFF, except the transistors P'1, N'2 and N'4, thus causing the charge transfer to the two tank capacitors 31 and 34, respectively, thus generating the high level voltage Vpos and Vneg.

The low voltage generation (0.7 Volt) is now illustrated in FIG. 8 which shows that:
  during a first phase, all the transistors are switched OFF while transistors P'3, P'2 are switched ON, thus causing the connection in series of the two fly capacitors 72 and 73.
  then, during a second phase, all transistors are switched OFF except transistors P'1, N'2 and N'4, thus causing the charge transfer to the respective tank capacitors 31 and 34, respectively.

Optionally, a third phase may be considered wherein all transistors are switched off, except transistors N'3 and N'5 so as to achieve charge compensation between the two fly capacitors.

Figure 9:
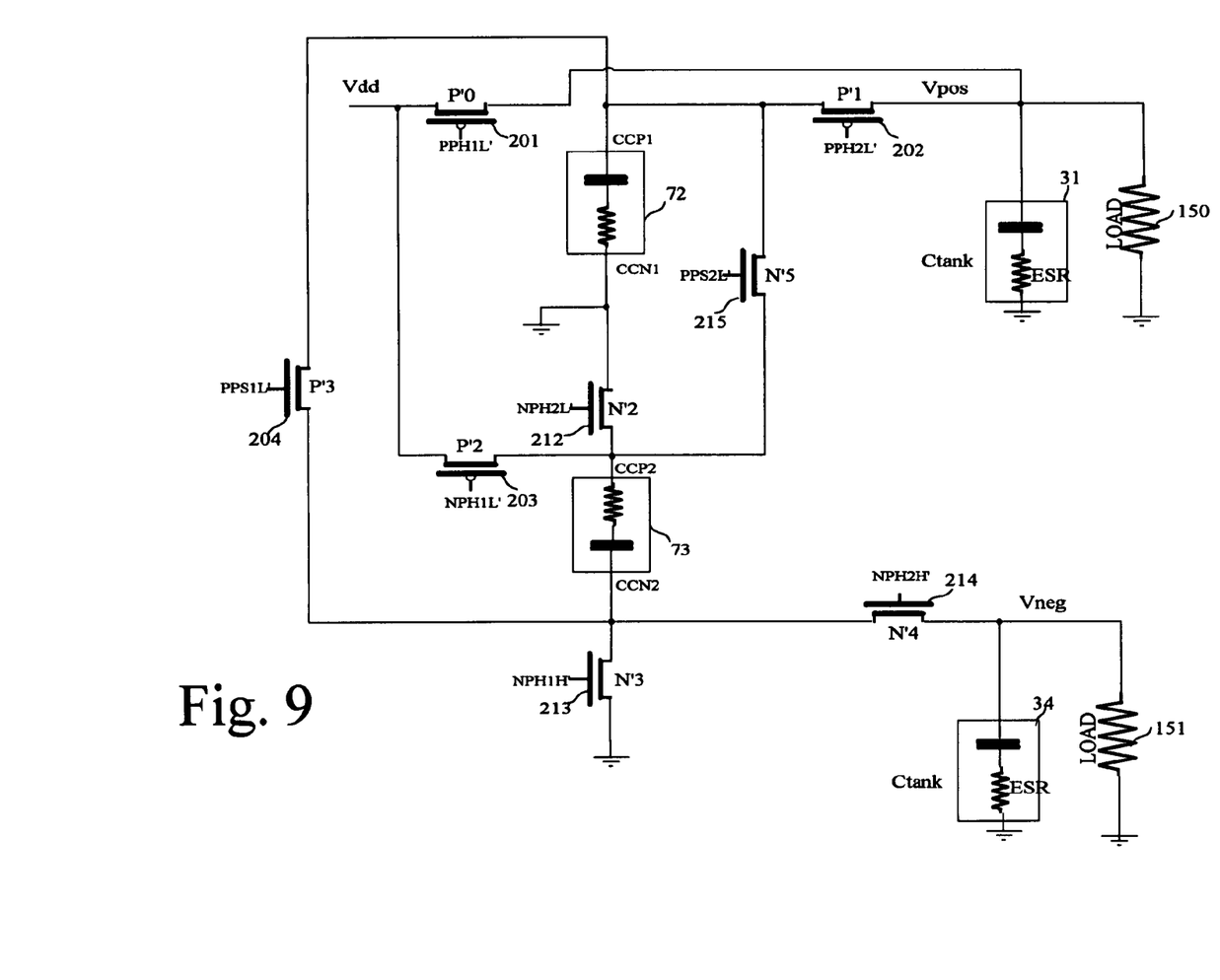
FIGS. 9 and 10 illustrate a third embodiment of the invention which shows higher efficiency for generating high voltage.

With respect to FIG. 9, there is now described a third embodiment which shows the advantage, with respect to the embodiment of FIG. 6, of showing less voltage drop between the power voltage Vdd and the load. For the sake of clarity, all the components which are identical to those of FIG. 6 keep the same reference number.

The circuit of FIG. 9 distinguishes, over the one illustrated in FIG. 6 and discussed above, in that the drain of transistor 201 (P'0) is no longer connected to the common terminal of P'3 transistor 204, CCP1 fly capacitor and the source of P'1 transistor, but is now directly connected to the load as shown in the figure.

Figure 10:
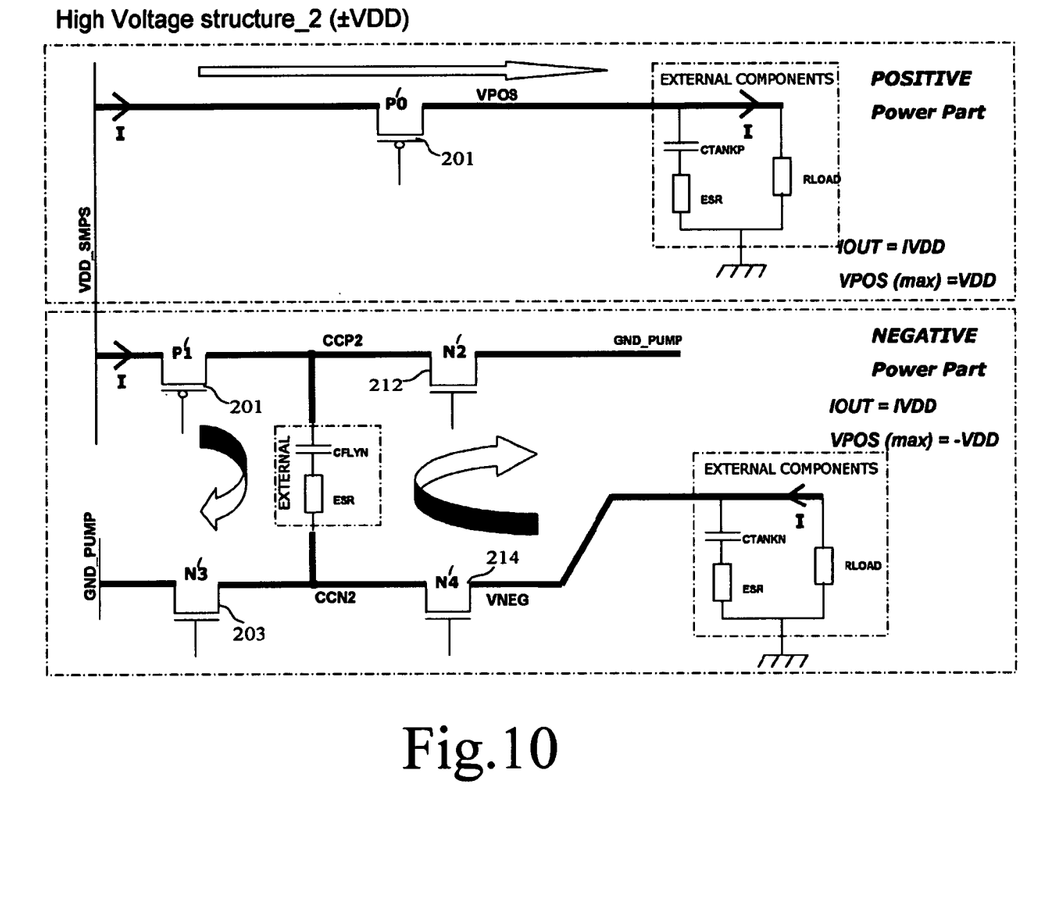

This results in the fact that limited voltage drops are brought when the high voltage is being generated, as shown in figure schematics of FIG. 10.

Conversely the generation of the low voltage still complies with the schematics of FIG. 8, discussed below.

One thus sees that the same technical result is attained with a very simple structure since fly capacitor 72 only requires one transistor P0.

Furthermore, and this is a very advantageous effect, fly capacitor 72 only requires one ball thus decreasing the complexity to be brought to the integrated circuit.

One sees that the second embodiment results in the saving of
  1 ball, i.e. external metal connection of the chip which enables to solder the chip on a electronic board
  2 PADS, i.e. space of connection between balls and metals POWER MOS metals access.
  3 power MOS.

The gain of power MOS enables to maximize the proximity between PADS and POWER MOS and thus reducing the metal access resistivity:

the drop between the input and the output can be lower, so the efficiency increases.

the power part area is reducing by the fact we have less POWER MOS occupying a significant area one the substrate.

the area of all staying power MOS can decrease also because of better access optimization and less metal resistivity connection. Thus the area decreases a new one and the switching loses also.

The invention claimed is:

1. A dual voltage charge pump circuit configured to be associated with one power supply to generate two output voltages, a positive and a negative (Vnpos, Nneg), with two different low and high levels; said circuit comprising:
a first fly capacitor having a first and a second end;
a second fly capacitor having a first and a second end;
a first tank capacitor having a first and a second end, said second end being connected to ground;
a second tank capacitor having a first and a second end, said second end being connected to ground;
a first MOS transistor being of a PMOS type having a source, a drain and a gate terminal, said source of said first transistor being connected to the power supply (Vdd), said drain of said first transistor being connected to a first end of said first fly capacitor; and said gate terminal receiving a first control signal;
a second MOS transistor being of a NMOS type having a source, a drain and a gate terminal, said source of said second transistor being connected to ground, said drain being connected to said second end of said first fly capacitor and said gate receiving a second control signal;
a third MOS transistor being of a PMOS type having a source, a drain and a gate terminal, said source of said third PMOS transistor being connected to the power supply, said drain of said third PMOS transistor being connected to said first end of said second fly capacity, said gate of said third MOS transistor receiving a third control signal;
a fourth MOS transistor being of a NMOS type, having a source, a drain and a gate terminal, said source of said fourth NMOS transistor being connected to ground, said drain of said fourth NMOS transistor being connected to said first end of said second fly capacitor, said gate of said fourth MOS transistor receiving a fourth control signal;
a fifth MOS transistor of a NMOS type having a source, a drain and a gate terminal, said source of said fifth MOS transistor being connected to ground, said drain of said fifth MOS transistor being connected to said second end of said second flying capacitor, and said gate of said fifth MOS transistor receiving a fifth control signal;
a sixth MOS transistor having a source, a drain and a gate terminal, said source of said sixth MOS transistor being connected to said first end of said first flying capacitor and said drain of said sixth MOS transistor being connected to said first second end of said second fly capacitor, and said gate of said sixth MOS transistor receiving a sixth control signal;
a seventh MOS transistor having a source and a drain terminal respectively connected to the first end of said first fly capacitor and to the first end of said second fly capacitor, said seventh MOS transistor having a gate terminal receiving a seventh control signal;
an eighth MOS transistor of a PMOS type having a source, a drain and a gate terminal, said source of said eighth PMOS transistor being connected to said first end of said first fly capacitor and said drain of said eighth PMOS transistor being connected to said first end of said first tank capacitor and generating said positive output voltage, said gate of said eighth PMOS transistor receiving an eighth control signal; and
a ninth MOS transistor of a NMOS type having a source, a drain and a gate terminal, said drain of said ninth MOS transistor being connected to the second end of said second fly capacitor, said source of said ninth MOS transistor being connected to said first end of said second tank capacitor and generating said negative voltage, said gate of said ninth MOS transistor receiving a ninth control signal.

2. A dual voltage charge pump circuit as defined in claim 1 wherein said sixth and said seventh MOS transistors are PMOS and NMOS transistors respectively.

3. A dual voltage charge pump circuit as defined in claim 1 wherein said sixth and said seventh MOS transistors are NMOS and PMOS transistors respectively.

4. Method for operating the dual voltage charge pump circuit according to claim 1 wherein the generation of a high positive voltage is performed by means of the following steps:
switching on said first and said second transistors during a first phase while switching off all other transistors so as to charge said first fly capacitor at the nominal voltage value available;
switching on said second transistor and said eighth transistor so as to perform a charge transfer from said first fly capacitor to said first tank capacitor.

5. Method for operating the dual voltage charge pump circuit according to claim 4 wherein a third phase of load compensation is performed by means of the switching on of said sixth transistor.

6. Method for operating the dual voltage charge pump circuit according to claim 1 wherein the generation of a high value negative voltage is performed by means of the following steps:
switching on said third and said fifth transistors during a first phase while switching off all other transistors so as to charge said second fly capacitor at the nominal voltage value available;
switching on said fourth transistor and said ninth transistor so as to perform a charge transfer from said second fly capacitor to said second tank capacitor.

7. Method for operating the dual voltage charge pump circuit according to claim 1 wherein the generation of a low positive voltage is performed by means of the following steps:
switching on said second transistor, said third transistor and said sixth transistor during a first phase while switching off all other transistors so as to charge said first and second fly capacitors at half the nominal value available; and,
generating said low positive voltage by firstly switching on said second transistor and said eight transistor then;
generating said low negative voltage by switching on said fourth transistor and said ninth transistor;
switching off all other transistors, so as to perform a partial transfer of charge from said first and said second fly capacitors to said first and second tank capacitors, respectively.

8. Method for operating the dual voltage charge pump circuit according to claim 7 wherein a third phase of charge compensation is performed by means of switching on said sixth transistor.

9. Method for operating the dual voltage charge pump circuit according to claim 8 wherein a third phase of load compensation is performed by means of switching on said sixth transistor.

10. Method for operating the dual voltage charge pump circuit according to claim 7 wherein the generation of a low positive voltage is performed by means of the following steps:
   switching on said second transistor and sixth transistor during a first phase while switching off all other transistors so as to charge said first and second fly capacitors at half the nominal value available; and,
   generating said low positive voltage by switching on said eighth transistor and;
   generating said low negative voltage by switching on said third transistor and said ninth transistor;
   switching off all other transistors, so as to perform a partial transfer of charge from said first and said second fly capacitors to said first and second tank capacitors, respectively.

11. Method for operating the dual voltage charge pump circuit according to claim 10 wherein a third phase of charge compensation is performed by means of switching on said sixth transistor.

12. Circuit according to claim 1 wherein the drain of said first transistor is directly connected to the load instead of being connected to the first end of said first fly capacitor.

13. A dual voltage charge pump circuit configured to be associated with one power supply to generate two output voltages, a positive and a negative, with two different low and high levels; said circuit comprising:
   a first fly capacitor having a first and a second end, said second end being connected to the ground;
   a second fly capacitor having a first and a second end;
   a first tank capacitor having a first and a second end, said second end being connected to ground;
   a second tank capacitor having a first and a second end, said second end being connected to ground;
   a first MOS transistor being of a PMOS type having a source, a drain and a gate terminal, said source of said first transistor being connected to the power supply, said drain of said first transistor being connected to a first end of said first fly capacitor and said gate terminal receiving a first control signal;
   a second MOS transistor being of a PMOS type, having a source, a drain and a gate terminal, said source of said second transistor being connected to the power supply, said drain of said second transistor being connected to said first end of said second fly capacity, said gate of said second transistor receiving a second control signal;
   a third MOS transistor being of a NMOS type, having a source, a drain and a gate terminal, said source of said third transistor being connected to ground, said drain of said third transistor being connected to said first end of said second fly capacitor, said gate of said third transistor receiving a third control signal;
   a fourth MOS transistor being of a NMOS type, having a source, a drain and a gate terminals, said source of said fourth transistor being connected to ground, said drain of said fourth transistor being connected to said second end of said second flying capacitor, and said gate of said fourth transistor receiving a fourth control signal;
   a fifth MOS transistor having a source, a drain and a gate terminal, said source of said fifth transistor being connected to said first end of said first flying capacitor and said drain of said fifth transistor being connected to said first second end of said second fly capacitor and said gate of said fifth transistor receiving a fifth control signal;
   a sixth MOS transistor having a source and a drain respectively connected to the first end of said first fly capacitor and to the first end of said second fly capacitor, said sixth MOS transistor having a gate terminal receiving a sixth control signal;
   a seventh OS transistor of a PMOS type having a source, a drain and a gate terminal, said source of said seventh transistor being connected to said first end of said first fly capacitor and said drain of said seventh transistor being connected to said first end of said first tank capacitor and generating said positive output voltage, said gate of said seventh transistor receiving a seventh control signal;
   an eighth MOS transistor being of a NMOS type, having a source, a drain and a gate terminals, said drain of said eighth transistor being connected to the second end of said second fly capacitor, said source of said eight transistor being connected to said first end of said second tank capacitor (34) and generating said negative voltage, said gate of said eight transistor receiving an eight control signal.

14. Method for operating the dual voltage charge pump circuit according to claim 13 wherein the generation of a high positive voltage is performed by means of the following steps:
   switching on said first transistor during a first phase while switching off all other transistors so as to charge said first fly capacitor at the nominal voltage value available;
   switching on said eighth transistor so as to perform a charge transfer from said first fly capacitor to said first tank capacitor.

15. Method for operating the dual voltage charge pump circuit according to claim 13 wherein the generation of a high value negative voltage is performed by means of the following steps:
   switching on said second transistor and said fourth transistor during a first phase while switching off all other transistors so as to charge said second fly capacitor at the nominal voltage value available;
   switching on said third transistor and said ninth transistor so as to perform a charge transfer from said second fly capacitor to said second tank capacitor.

* * * * *